US009652727B1

(12) United States Patent
Mateer et al.

(10) Patent No.: US 9,652,727 B1
(45) Date of Patent: May 16, 2017

(54) MOBILE CARE WITH A VIRTUAL QUEUE

(75) Inventors: Michael T. Mateer, Omaha, NE (US);
James K. Boutcher, Omaha, NE (US);
Jesse Andersen, San Francisco, CA (US)

(73) Assignee: WEST CORPORATION, Omaha, NE (US)

(*) Notice: Subject to any disclaimer, the term of this patent is extended or adjusted under 35 U.S.C. 154(b) by 140 days.

(21) Appl. No.: 13/269,845

(22) Filed: Oct. 10, 2011

(51) Int. Cl.
*G06Q 10/00* (2012.01)
*G06Q 10/06* (2012.01)

(52) U.S. Cl.
CPC .............. *G06Q 10/06314* (2013.01)

(58) Field of Classification Search
CPC ........ G06Q 10/00; G06Q 40/00; G06F 17/60; G06F 10/00
USPC ........................................... 705/7.15
See application file for complete search history.

(56) References Cited

U.S. PATENT DOCUMENTS

| | | | | |
|---|---|---|---|---|
| 7,379,920 B2* | 5/2008 | Leung et al. | .................... | 705/67 |
| 7,992,192 B2* | 8/2011 | Maher et al. | ...................... | 726/3 |
| 8,068,595 B2* | 11/2011 | Odinak et al. | ........... | 379/265.01 |
| 8,170,897 B1* | 5/2012 | Cohen et al. | ................. | 705/7.13 |
| 8,243,893 B2* | 8/2012 | Hayes et al. | ............... | 379/88.23 |
| 8,249,898 B2* | 8/2012 | Schoenberg | ....................... | 705/3 |
| 8,306,044 B2* | 11/2012 | Walter | .......................... | 370/412 |
| 8,387,121 B1* | 2/2013 | Surti | ..................... | H04W 12/06 726/28 |
| 2002/0032853 A1* | 3/2002 | Preston et al. | ................ | 713/151 |
| 2005/0195960 A1* | 9/2005 | Shaffer et al. | ........... | 379/265.02 |
| 2008/0262910 A1* | 10/2008 | Altberg et al. | ................. | 705/14 |
| 2008/0262911 A1* | 10/2008 | Altberg et al. | ................. | 705/14 |
| 2010/0093284 A1* | 4/2010 | Terrero Diaz-Chiron et al. | .......................... | 455/67.11 |
| 2010/0131867 A1* | 5/2010 | Kumar | .......................... | 715/758 |
| 2010/0192207 A1* | 7/2010 | Raleigh | ............................ | 726/6 |
| 2011/0093338 A1* | 4/2011 | Peckover | .................. | 705/14.54 |

* cited by examiner

*Primary Examiner* — Romain Jeanty
(74) *Attorney, Agent, or Firm* — Raffi Gostanian

(57) ABSTRACT

An apparatus, a method, and a computer program receive a request message from a mobile device to connect with an agent and authenticate the request message and provisioning a database for enabled services and service location. A service provider is identified and selected from a plurality of service providers. As a result, the request message is transmitted to the service provider in order to determine availability of the service provider.

15 Claims, 5 Drawing Sheets

MOBILE CARE WITH A VIRTUAL QUEUE

FIELD

The present invention relates to a mobile care system and, more particularly, to a mobile care system that interfaces with a mobile device to allow a consumer to connect with a contact center.

BACKGROUND

Mobile devices have become more and more pervasive in today's marketplace. As a result, various types of mobile applications are being developed to assist mobile users with various activities. As mobile devices have become the way consumers (or customers) communicate, building mobile applications to interface with the consumer is becoming more prevalent.

SUMMARY

Certain embodiments of the present invention may provide solutions to the problems and needs in the art that have not yet been fully identified, appreciated, or solved by current customer service mobile applications. For instance, one or more embodiments of the present invention describe a mobile care application with a virtual queue to allow the consumer to quickly and efficiently communicate with one or more contact centers.

In accordance with an embodiment of the present invention, a computer-implemented method is provided. The method includes receiving a request message from a mobile device to connect with an agent and authenticating the request message and provisioning a database for enabled services and service location. The method also includes identifying and selecting a service provider from a plurality of service providers. The method further includes transmitting the request message to the service provider in order to determine availability of the service provider.

In yet another embodiment of the present invention, a computer program is provided. The computer program is embodied on a non-transitory computer readable medium and causes a processor to receive a request message from a mobile device to connect with an agent and authenticate the request message and to provision a database for enabled services and service location. The program also causes the processor to identify and select a service provider from a plurality of service providers, as well as transmit the request message to the service provider in order to determine availability.

In yet another embodiment of the present invention, an apparatus is provided. The apparatus includes a processor and memory storing an application. The processor is configured to receive a request message from a mobile device to connect with an agent and authenticate the request message and provision a database for enabled services and service location. The processor is also configured to identify and select a service provider from a plurality of service providers, as well as transmit the request message to the service provider in order to determine availability.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures.

DETAILED DESCRIPTION OF THE EMBODIMENTS

It will be readily understood that the components of the invention, as generally described and illustrated in the figures herein, may be arranged and designed in a wide variety of different configurations. Thus, the following detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

Figure 1:
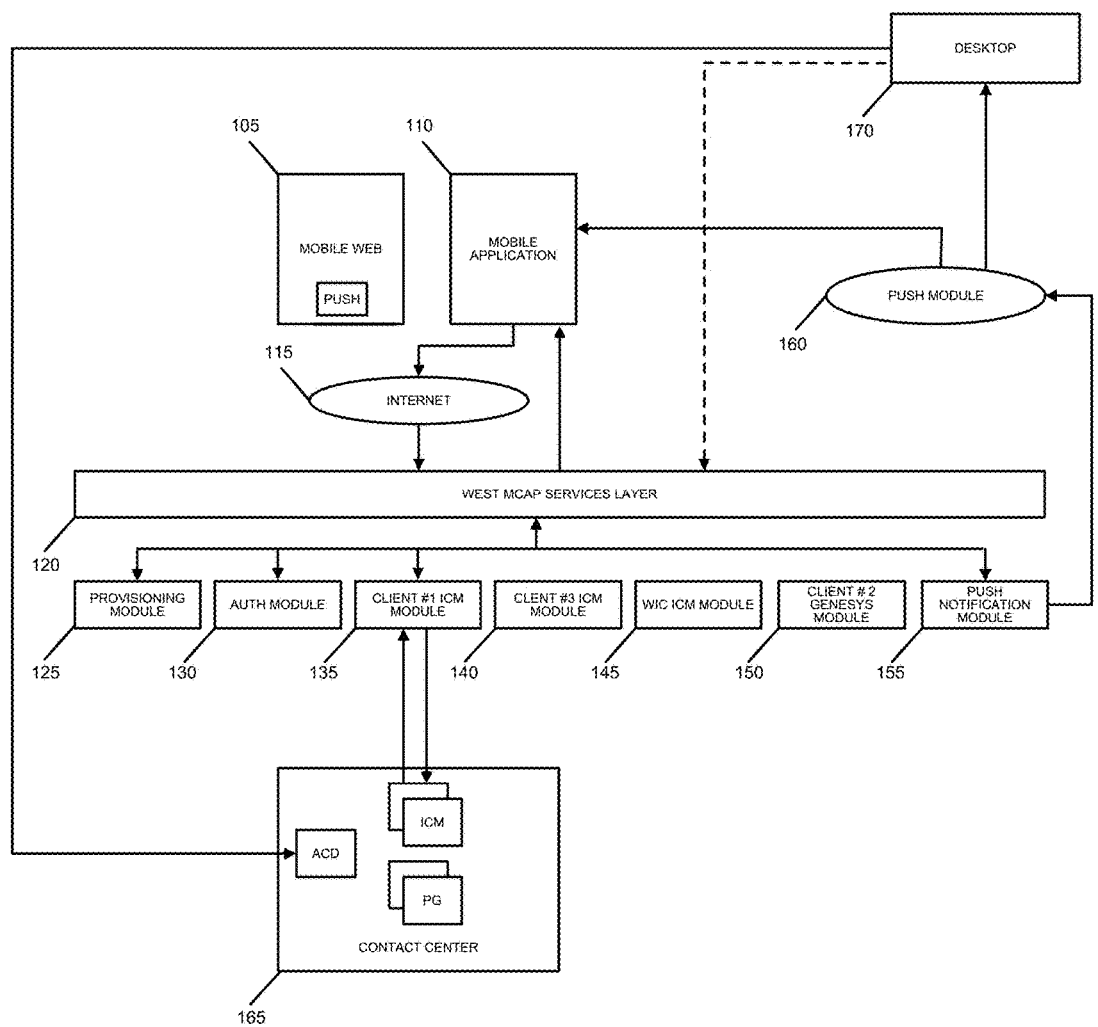
FIG. 1 illustrates a mobile care system, in accordance with an embodiment of the present invention.

FIG. 1 illustrates a mobile care system 100, in accordance with an embodiment of the present invention. The system 100 includes a mobile web 105, a mobile application (or native application) 110, the Internet 115, West MCAP services layer 120, a provisioning module 125, an authentication module 130, a Client #1 ICM module 135, a Client #3 ICM module 140, a WEST CORPORATION ICM module 145, an Client #2 Genesys module 150, a push notification module 155, a mobile push services module 160, and a Client #1 contact center 165.

In this embodiment, the mobile application 110 is stored on a mobile device (not shown). A person of ordinary skill in the art will appreciate that the West MCAP services layer 120, the provisioning module 125, the authentication module 130, the Client #1 ICM module 135, the Client #3 ICM module 140, the WEST CORPORATION ICM module 145, the Client #2 Genesys module 150, the push notification module 155, and the mobile push services module 160 can be stored on one or more servers (not shown). The Client #1 contact center 165 can be implemented on a remote server (not shown). However, what hardware devices are used to store the various software applications, and where they are stored, is a matter of design choice.

The mobile application 110 is configured to send or transmit a request message to a mobile web server (not shown), via the Internet 115. The mobile web server can be implemented on the WEST MCAP services layer 120. The request message is a request to connect an agent with the user of the mobile application 110. The request message may include, amongst other things, a client identification, an application authentication key, a callback number, etc. Using the information in the request message, the mobile web server is configured to authenticate the mobile application (or user) 110, via the authentication module 130 and return a session token to the mobile application 110. Upon authentication, the mobile web server is further configured to utilize the provisioning module 125 to provision a database (not shown) for enabled services and service location based on the information included in the request message. It should be appreciated that the mobile web server can provision for client identification, an application authentication key, enabled services, service location, and security level information, as well as any other desired information or data.

Based on the provisioning, the mobile web server then forwards the request message to the appropriate server or service provider. For instance, the request message can be sent to the appropriate Client #1 IVR-PG servers or the Client #1 ICM module 135. If the Client #1 ICM module 135 does not have agents available, the call of the mobile application is placed in a queue and a progress message is sent to the mobile web server. The mobile web server forwards or transmits the progress message to the mobile application 110.

If the agent is currently available, or once the agent becomes available, the Client #1 ICM module 135 sends an agent selected message to the mobile web server. The agent selected message can include the client identification, application authorization, and other optional data such as target contact center information and/or dial-in number (i.e., 1-8YY Number). The mobile web server issues a push notification request message, and sends the push notification request message with the target contact center information to the push notification module (or push notification services) 155. The push notification module 155 forwards the push notification request message to the mobile push module (or mobile push services) 160, which forwards the push notification request message to the mobile application 110 with a message, such as "the agent is ready to take your call." The user of the mobile application 110 selects the view and/or call button to open the mobile application 110 and the event is sent to the mobile web server. The mobile application 110 dials the 1-8YY number to begin the call and the call is connected to the target call center in order for the target call center to assist the user of the mobile application 110. In this case, the target call center can be the Client #1 contact center 165. When the call has ended with the ACD of the Client #1 contact center 165, the call is terminated.

Figure 2:
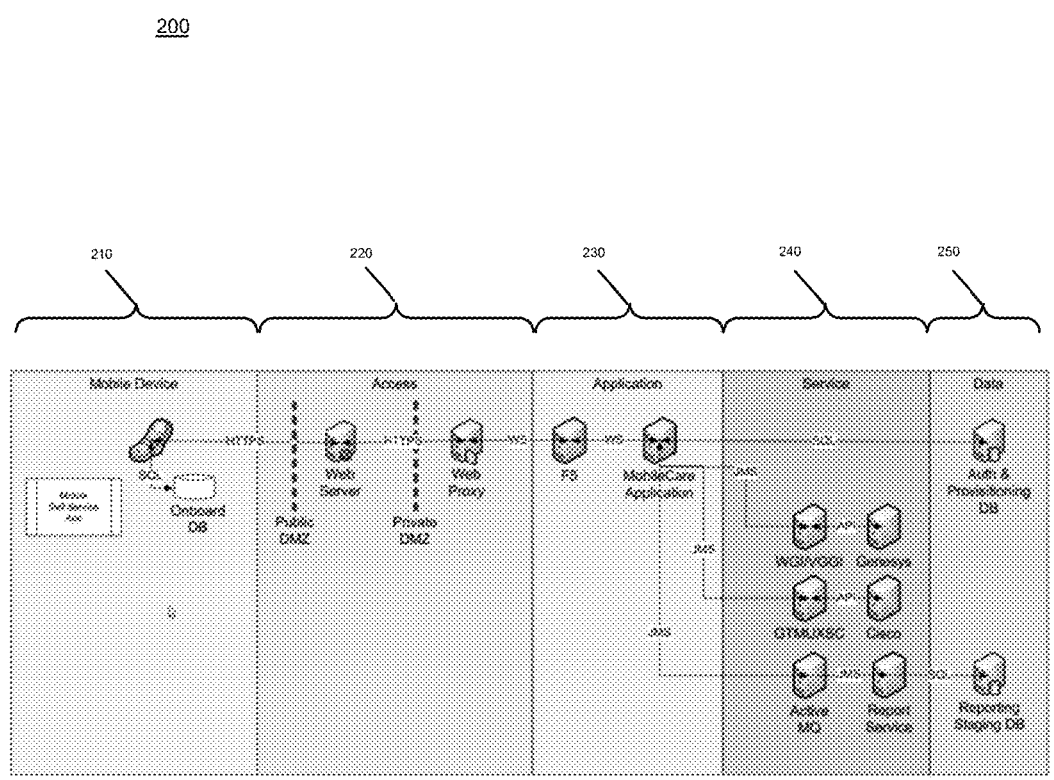
FIG. 2 illustrates a mobile care application diagram, in accordance with one or more embodiments of the present invention.

FIG. 2 illustrates a mobile care application diagram 200, in accordance with one or more embodiments of the present invention. In this embodiment, the diagram includes a mobile device layer 210, an access layer 220, an application layer 230, a service layer 240, and a data layer 250. The mobile device layer 210 can include a mobile device, which includes an onboard database to store a mobile self service application as well as other information appreciated by a person of ordinary skill in the art. The access layer 220 can include a web server and a web proxy to assist the mobile self service application (or a mobile application) in communicating with the mobile care application (or mobile care service application). The application layer 230 includes a server, which stores at least the mobile care application. The service layer 240 includes a plurality of application programming interfaces (APIs) as well as servers and other services. The data layer 250 includes a database that allows for authentication and provisioning by the mobile care application, as well as a reporting staging database.

In this embodiment, a user (or customer) of a mobile device includes a mobile application, which has been enabled with a West mobile care service application (or a mobile care application). When a "Connect Me to an Agent" button is selected on the mobile application, the mobile application communicates with the mobile care service application. The mobile care service application is operably connected to one or more clients (or service providers), with each client including a contact center. See service layer 240 in FIG. 2. Because the mobile care service application can access each contact center, the mobile care service application can request an agent at one of the contact centers with the appropriate skills needed to effectively service the user. Once the mobile care service application identifies the agent with the skills needed to handle the request, the mobile application receives information instructing the mobile application to dial a specific phone number and, upon dialing the phone number, the mobile care service application is configured to connect the mobile application to the agent at the contact center.

It should be appreciated that, when the "Connect Me to an Agent" button is selected, caller data is collected and passed to the mobile care service application for authentication and provisioning. In particular, when the user selects the "Connect Me to an Agent" button, the caller data is sent to the targeted contact center so the agent can have the appropriate information when the call arrives at the contact center. This allows the agent to better understand what the customer was doing within the mobile application just before selecting the "Connect Me to an Agent" button.

Figure 3:
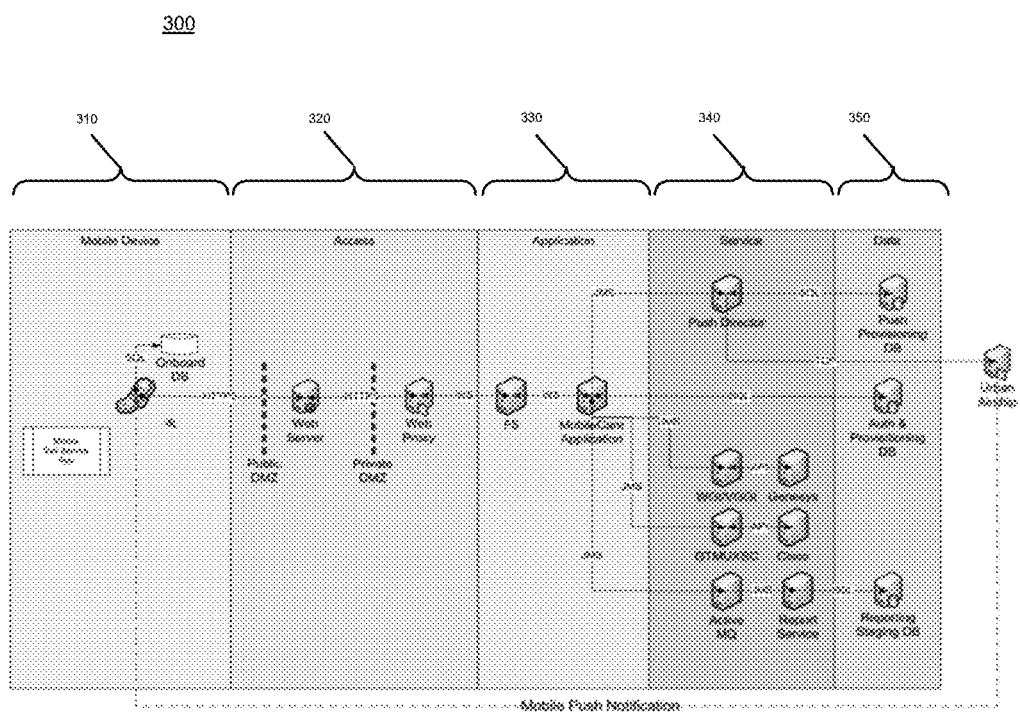
FIG. 3 illustrates a mobile care and queue application diagram, in accordance with one or more embodiments of the present invention.

FIG. 3 illustrates a mobile care and queue application diagram 300, in accordance with one or more embodiments of the present invention. The diagram 300 includes a mobile device layer 310, an access layer 320, an application layer 330, a service layer 340, and a data layer 350. The mobile device layer includes a mobile device with an onboard database. The database includes a mobile self service application (or mobile application), as well as any other information that would be appreciated by a person of ordinary skill in the art. The access layer 320 includes a web server and a web proxy to assist the mobile application in communicating with a mobile care application.

The application layer 330 includes a server, which includes at least the mobile care application (or a mobile care service application). The service layer 340 includes a push director and APIs, as well as servers and other services. The data layer 350 includes a push provisioning database, an authentication and provisioning database, and a reporting stage database.

In this embodiment, a mobile device includes a mobile application, which has been enabled with the West mobile care service. Similar to FIG. 2, when the user of the mobile application selects the "connect me to an agent" button, the mobile application communicates with the mobile care service application. This time, however, the mobile application prompts the user with, "This type of request usually has high wait times. Would you like us to notify you when you're next in the queue?" If the user selects "yes", this information is sent to the mobile care service application. The mobile care service application is operably connected to one or more clients (or service providers), with each client including a contact center. See service layer in FIG. 3. Because the mobile care service application can access each contact center, the mobile care service application can request an agent at one of the contact centers with the appropriate skills needed to effectively service the user. The mobile care service application determines whether the agent is available. If the agent is not available, the mobile care service application responds to the mobile application by notifying the mobile application that the request has been received, and the "expected wait time" is "X" minutes. The mobile application then displays this information to the user like a timer and informs the user that the user can close this window and they will be notified when they are next to connect with the agent.

Once the mobile care service application identifies the agent with the skills needed to handle the user's request, the mobile care service application sends an application "Alert" or "Notification" with a message such as "Your agent is ready to speak with you . . . click View to be connected." Once the user selects the view button, the mobile application then dials a specific phone number and connects the user to a contact center agent.

Similar to the embodiment described in FIG. 2, caller data can be collected by the mobile application and sent to the mobile care service application. The mobile care service application is configured to send the call data to a targeted contact center so the selected agent can service the user when the call arrives at the contact center.

Figure 4:
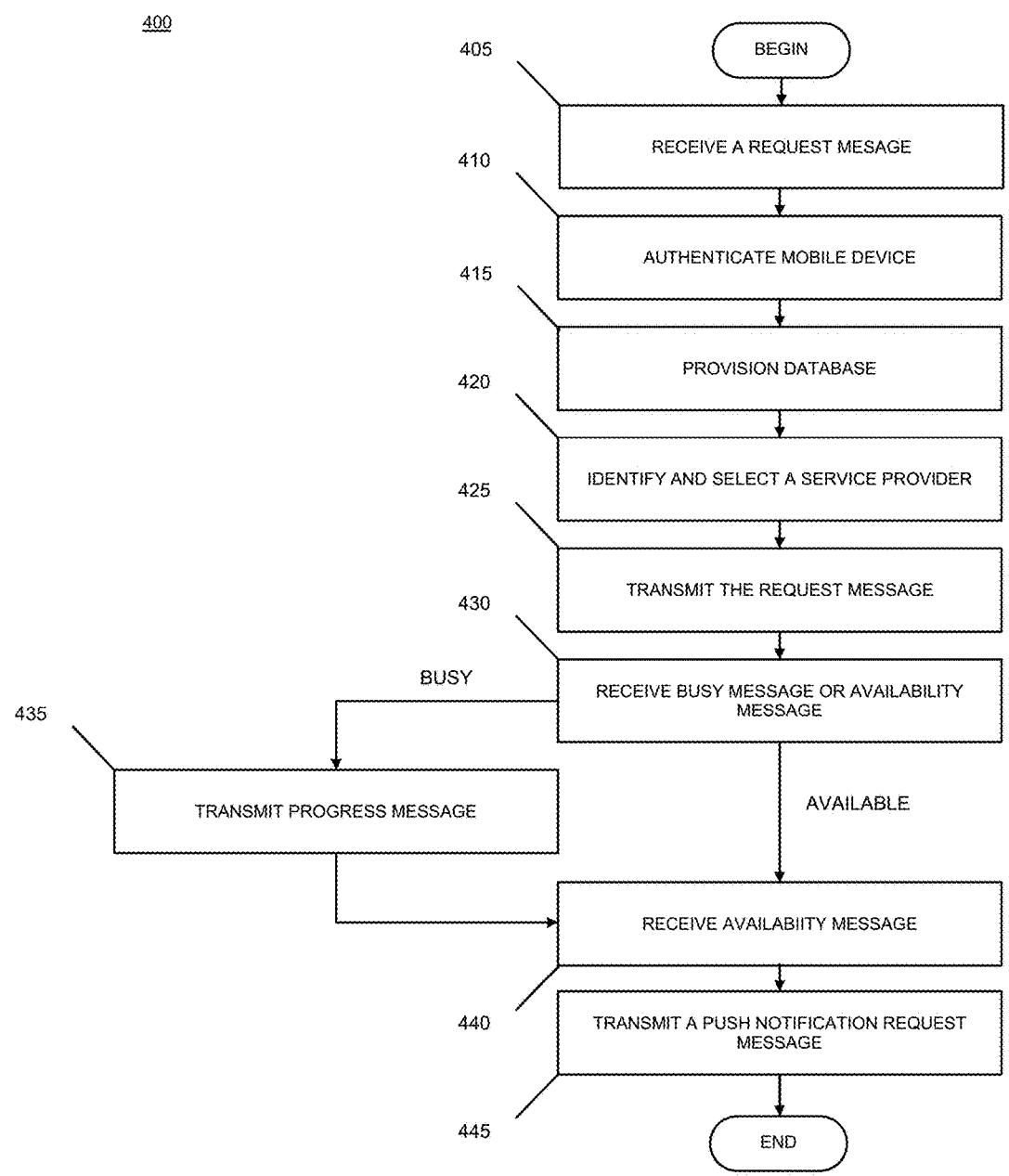
FIG. 4 illustrates a method for performing a mobile care and queue application, in accordance with one or more embodiments of the present invention.

FIG. 4 illustrates a method 400 for performing a mobile care and queue application, in accordance with one or more embodiments of the present invention. At 405, a mobile care server (or service application) receives a request message from a mobile device. At 410, the mobile care server authenticates the mobile device and returns a session token to the mobile device. At 415, the mobile care server provisions a database for enabled services and service location when the authentication is complete. Upon completion of provisioning, the mobile care server at 420 identifies and selects an appropriate service provider from a plurality of service providers and, at 425, the mobile care server transmits the request message to the selected service provider.

At 430, the mobile care server receives either a busy message or an availability message from the service provider. If the busy message is received, then at 435 the mobile care server transmits a progress message to the mobile device. At 440, when the availability message is received, then at 445 the mobile care server transmits a push notification request message to the mobile device so the mobile device can connect with the service provider.

The method steps shown in FIG. 4 may be performed, in part, by a computer program product, encoding instructions for a nonlinear adaptive processor to cause at least the methods described in FIG. 4 to be performed by the apparatuses discussed herein. The computer program product may be embodied on a non-transitory computer readable medium. The computer readable medium may be, but is not limited to, a hard disk drive, a flash device, a random access memory, a tape, or any other such medium used to store data. The computer program product may include encoded instructions for controlling the nonlinear adaptive processor to implement the method described in FIG. 4, which may also be stored on the computer readable medium.

The computer program product can be implemented in hardware, software, or a hybrid implementation. The computer program product can be composed of modules that are in operative communication with one another, and which are designed to pass information or instructions to display. The computer program product can be configured to operate on a general purpose computer, or an application specific integrated circuit ("ASIC").

Figure 5:
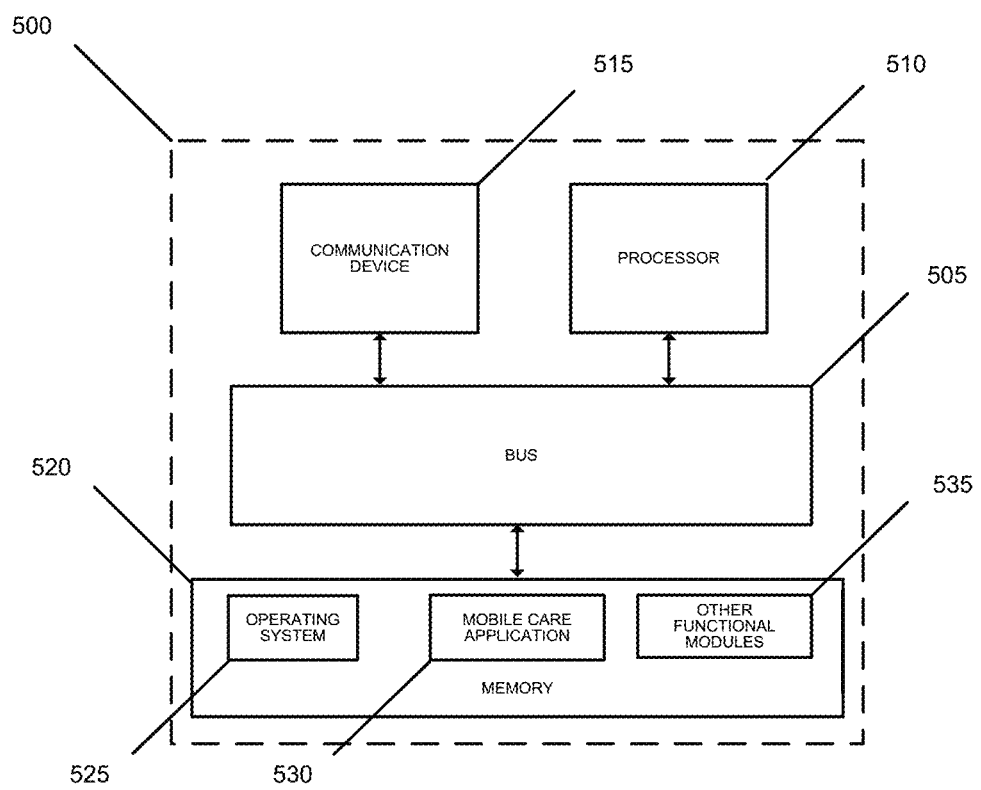
FIG. 5 illustrates a block diagram of a mobile care and queue application system, in accordance with one or more embodiments of the present invention.

FIG. 5 illustrates a block diagram of a mobile care and queue application system 500, in accordance with one or more embodiments of the present invention. System 500 may include a bus 505 or other communication mechanism that can communicate information and a processor 510, coupled to bus 505, that can process information. Processor 510 can be any type of general or specific purpose processor. System 500 may also include a memory 520 that can store information and instructions to be executed by processor 510. Memory 520 can be comprised of any combination of random access memory ("RAM"), read only memory ("ROM"), static storage such as a magnetic or optical disk, or any other type of computer readable medium. System 500 may also include a communication device 515, such as a network interface card, that may provide access to a network.

The computer readable medium may be any available media that can be accessed by processor 510. The computer readable medium may include both volatile and nonvolatile medium, removable and non-removable media, and communication media. The communication media may include computer readable instructions, data structures, program modules, or other data and may include any information delivery media.

According to one embodiment, memory 520 may store software modules that may provide functionality when executed by processor 510. The modules can include an operating system 525 and a mobile care application 530, as well as other functional modules 535. Operating system 525 may provide operating system functionality for system 500. Because system 500 may be part of a larger system, system 500 may include one or more additional functional modules 535 to include the additional functionally. For example, other functional modules 535 may include mobile care and queue application modules as described above.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
 receiving a request message at a web server from a mobile device via a mobile application to connect with an agent associated with a service provider;
 authenticating the request message via an authentication module of the web server and provisioning a database via a provisioning module of the web server for enabled services and a service location of the service provider;
 authenticating the mobile application operated by the mobile device and providing a session token to the mobile application responsive to authenticating the mobile application;
 transmitting the request message to a service provider server associated with the service provider in order to determine an availability of the service provider, and wherein when no agent is currently available, the request message is placed in a queue at the service provider server and a progress message is created and forwarded to the mobile device via the web server to inform the mobile device of the agent availability; and when an agent is available, generating an agent telephone number that can be dialed to access the available agent via the service provider server;

appending the agent telephone number to an agent availability message via the service provider server;

transmitting the agent availability message to the web server which forwards the agent availability message to the mobile device via a push notification module of the web server; and receiving a call to the agent telephone number initiated from the mobile application operated by the mobile device.

2. The method of claim 1, wherein the request message comprises client identification, an application authentication key, and a call back number.

3. The method of claim 1, further comprising:

when the service provider is busy, receiving a progress message from the service provider; and when the service provider is available, receiving an agent selected message from the service provider.

4. The method of claim 3, wherein the progress message comprises a wait time and the agent selected message includes a call-in number.

5. The method of claim 3, further comprising:

generating a push notification request message in order for the mobile device to connect with the service provider.

6. A computer program, embodied on a non-transitory computer readable medium, the computer program causing a processor to:

receive a request message at a web server from a mobile device via a mobile application to connect with an agent associated with a service provider;

authenticate the request message via an authentication module of the web server and provision a database via a provisioning module of the web server for enabled services and service location of the service provider;

authenticate the mobile application operated by the mobile device and provide a session token to the mobile application responsive to authentication of the mobile application;

transmit the request message to a service provider server associated with the service provider in order to determine an availability of the service provider, and wherein when no agent is currently available, the request message is placed in a queue at the service provider server and a progress message is created and forwarded to the mobile device via the web server to inform the mobile device of the agent availability;

when an agent is available, generate an agent telephone number that can be dialed to access the available agent via the service provider server;

append the agent telephone number to an agent availability message via the service provider server;

transmit the agent availability message to the web server which forwards the agent availability message to the mobile device via a push notification module of the web server; and receive a call to the agent telephone number initiated from the mobile application operated by the mobile device.

7. The computer program of claim 6, wherein the request message comprises client identification, an application authentication key, and a call back number.

8. The computer program of claim 6, wherein the computer program further causes the processor to:

when the service provider is busy, receive a progress message from the service provider; and when the service provider is available, receive an agent selected message from the service provider.

9. The computer program of claim 8, wherein the progress message comprises a wait time and the agent selected message includes a call-in number.

10. The computer program of claim 8, wherein the computer program further causes the processor to:

generate a push notification request message in order for the mobile device to connect with the service provider.

11. An apparatus, comprising:

a processor; and memory storing an application, wherein the processor is configured to:

receive a request message from a mobile device via a mobile application to connect with an agent associated with a service provider;

authenticate the request message via an authentication module and provision a database via a provisioning module for enabled services and a service location of the service provider;

authenticate the mobile application operated by the mobile device and provide a session token to the mobile application responsive to authentication of the mobile application;

transmit the request message to a server associated with the service provider in order to determine an availability of the service provider, and wherein when no agent is currently available, the request message is placed in a queue at the service provider and a progress message is created and forwarded to the mobile device to inform the mobile device of the agent availability;

when an agent is available, generate an agent telephone number that can be dialed to access the available agent via the service provider server;

append the agent telephone number to an agent availability message via the service provider server;

transmit the agent availability message to the mobile device via a push notification module; and receive a call to the agent telephone number initiated from the mobile application operated by the mobile device.

12. The apparatus of claim 11, wherein the request message comprises client identification, an application authentication key, and a call back number.

13. The apparatus of claim 11, wherein the processor is further configured to:

when the service provider is busy, receive a progress message from the service provider; and when the service provider is available, receive an agent selected message from the service provider.

14. The apparatus of claim 13, wherein the progress message comprises a wait time and the agent selected message includes a call-in number.

15. The apparatus of claim 13, wherein the processor is further configured to:

generate and transmit a push notification request message to the mobile device in order for the mobile device to connect with the service provider.

* * * * *